United States Patent Office 3,362,983
Patented Jan. 9, 1968

3,362,983
PROCESS FOR THE MANUFACTURE OF ETHYL-
ENES SUBSTITUTED IN THE 1-POSITION
Kurt Sennewald and Wilhelm Vogt, Knapsack, near Cologne, and Heinz Erpenbach, Surth, near Cologne, Germany, assignors to Knapsack-Griesheim Aktiengesellschaft, Knapsack, near Cologne, Germany, a corporation of Germany
No Drawing. Filed June 23, 1964, Ser. No. 377,413
Claims priority, application Germany, July 12, 1963,
K 50,201; Sept. 10, 1963, K 50,786
5 Claims. (Cl. 260—465.7)

ABSTRACT OF THE DISCLOSURE

Process for thermally splitting 1,2-substituted cyclobutanes to obtain 1-substituted ethylenes through the use of a reaction temperature of 400–1000° C., a pressure of 1–200 mm. mercury and a reaction residence time of about .1–10 seconds.

---

The present invention is concerned with a process for the manufacture of ethylenes which are substituted in the 1-position and have the general formula:

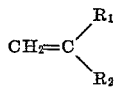

wherein $R_1$ stands for either a hydrogen atom or a halogenatom, and $R_2$ stands for a carboxylic acid group, an ester group or nitrile group or an aminomethyl group, by thermal cleavage to cyclobutane compounds having corresponding substituents in the 1,2-position.

It is known that cis-1,2-dimethylcyclobutane can be subjected to thermal cleavage under reduced pressure at a temperature of 380 to 430° C., resulting in the formation of cleavage products consisting partially of propylene and ethylene and a mixture comprising cis-2-butene and trans-2-butene. The nature of the isolated cleavage products indicates that cis-1,2-dimethylcyclobutane is split at high temperatures in both the 1,2- and 3,4-linkages and in the 2,3- and 1,4-linkages.

The conventional thermal cleavage of 1-cyano-1-carbethoxycyclobutane follows an analogous course, the compound being split into acrylonitrile and ethylene in the quantitative ratio of approximately 1:1 at 520° C. and after a period of 1 hour. In this case, the cleavage reaction involves the loss of the carbethoxy group.

The present invention unexpectedly provides a process for making ethylenes substituted in the 1-position, wherein a compound having the general formula:

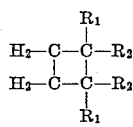

in which $R_1$ stands for either a hydrogen atom or a halogen atom and $R_2$ stands for a carboxylic group, an ester group or a nitrile group, or in which $R_1$ stands for a hydrogen atom and $R_2$ stands for a —$CH_2$—$NH_2$ group, is caused to flow in vapor form through a heated reaction tube, thermally split therein at a temperature within the range of about 400 to 1000° C., under a pressure of about 1 to 200 mm. mercury and within a period of time of about 0.1 to 10 seconds, and the resulting cleavage gas is condensed and then distilled so as to isolate therefrom compounds having the general formula:

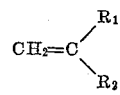

in which $R_1$ stands for a hydrogen atom or a halogen atom and $R_2$ stands for a carboxylic group, an ester group or a nitrile group, or $R_1$ stands for a hydrogen atom and $R_2$ stands for a —$CH_2$—$NH_2$ group.

The cleavage the cyclobutane ring of the respective starting product undergoes during the present process by cleavage of the 1,2- and 3,4-linkages alone is deemed an unexpected result in view of the methods customary for the thermal splitting of cyclobutane derivatives, bearing in mind that cleavage of the cyclobutane ring 2,3- and 1,4-linkages or separation of substituents from their initial linkage, which would also have been expected to occur, does in fact not occur or merely to a subordinate extent. Products which are formed by a cleavage mechanism other than the splitting of the 1,2- and 3,4-linkages could in no case be isolated.

The starting materials suitable for use in the process of the present invention include, for example: cyclobutane-1,2-dicarboxylic acid or 1,2-dihalogeno-, e.g. 1,2-dichloro- or 1,2-dibromo-cyclobutane-1,2-dicarboxylic acid, or the methyl-, ethyl-, propyl- or butyl ester of cyclobutane-1,2-dicarboxylic acid and the corresponding esters of 1,2-dihalogeno-, e.g. 1,2-dichloro- or 1,2-dibromo-cyclobutane-1,2-dicarboxylic acid, or cyclobutane-1,2-dinitrile or 1,2-dihalogeno-, e.g. 1,2-dichloro- or 1,2-dibromo-cyclobutane-1,2-dinitrile, or 1,2-diaminomethylcyclobutane. Instead of the 1,2-dihalogeno-cyclobutane compounds there may also be used 1-halogeno-cyclobutane compounds, e.g. 1-halogeno-cyclobutane-1,2-dinitrile, 1-halogeno-cyclobutane-1,2-dicarboxylic acid and esters of 1-halogeno-cyclobutane-1,2-dicarboxylic acid, the alcoholic components of which have 1 to 4 carbon atoms. In this case too, chlorine or bromine derivatives of cyclobutane are used as the halogenated starting products.

The above starting products are thermally split by being passed in vapor form through e.g. an electrically heated quartz tube, which is preferably maintained at a temperature of about 600 to 700° C. and under a pressure of preferably 5 to 20 mm. mercury. The vapors are allowed to remain in the reaction tube for a period of time of preferably about 0.5 to 2 seconds. The cleavage gas leaving the reaction tube should be cooled in a condenser at a temperature of about 20 to 30° C. and thereafter be liquefied and collected in a receiver cooled at a temperature of e.g. −70° C. In order to obtain the desired product, the liquefied cleavage product is distilled in conventional manner.

The products prepared by the process of the present invention are mostly obtained in yields of more than 90%. They deserve special commercial interest because they are used inter alia as starting material for numerous syntheses and as monomers for use in polymerization and copolymerization processes. The small losses in yield are not the result of a cleavage reaction other than in the 1,2- and 3,4-linkages, but are the customary result of the finishing treatment to which the products are ultimately subjected.

The following examples serve to illustrate the process of the present invention:

*Example 1*

106 grams cyclobutane-1,2-dinitrile (also termed 1,2-dicyano-cyclobutane) were caused to flow in vapor form under a pressure of 20 mm. mercury and at a temperature of 600° C. through an electrically heated quartz tube, and allowed to remain therein for 0.5 second. The resulting cleavage product was collected in a receiver cooled at —70° C. Subsequent distillation of the cleavage product at 78° C. gave 103 grams pure acrylonitrile, as identified by an ultra-red and gaschromatographic spectrum. The yield of pure acrylonitrile was 97.5% of the theoretical, calculated on the amount of cyclobutane-1,2-dinitrile used.

*Example 2*

146 grams 1,2-dichloro-cyclobutane-1,2-dinitrile were caused to flow in vapor form at a pressure of 12 mm. mercury and at a temperature of 600° C. through an electrically heated quartz tube 1 m. long and 30 mm. wide, and allowed to remain therein for 0.7 second. The resulting cleavage product was cooled over a condenser and collected in two receivers cooled at —70° C. Subsequent distillation of the liquefied cleavage product gave 138 grams $\alpha$-chloro-acrylonitrile having a boiling point of 88° C. at atmospheric pressure, corresponding to a yield of 94.5% of the theoretical, calculated on the amount of 1,2-dichlorocyclobutane-1,2-dinitrile.

*Example 3*

172 grams cyclobutane-1,2-dicarboxylic acid dimethylester, which had been obtained by hydrolyzing cyclobutane-1,2-dinitrile followed by esterification with methanol, were split in an electrically heated quartz tube at a pressure of 10 mm. mercury, a temperature of 600° C. and a time of residence of the material in the tube of 0.1 second. The resulting cleavage product and unreacted ester were separated by means of a condenser and collected in a receiver cooled at —70° C. The condensed reaction mixture was separated into its components by fractional distillation resulting in the formation of 72 grams acrylic acid methylester having a B.P.$_{170}$ of 40–41° C. and of 93 grams unreacted ester. 45% of the cyclobutane-1,2-dicarboxylic acid dimethylester underwent conversion, and the acrylic acid methylester was obtained in a yield of 91.3%.

*Example 4*

Cyclobutane-1,2-dicarboxylic acid dibutylester, prepared by hydrolyzing cyclobutane-1,2-dinitrile followed by esterification with butanol, was split in a quartz tube at a pressure of 30 mm. mercury, a temperature of 650° C. and a residence time of 0.1 second of the compound in the tube. Fractional distillation of the reaction mixture indicated a conversion rate of 78.4%, and acrylic acid butylester was obtained in a yield of 52.1% of the theoretical.

*Example 5*

1 - chloro - cyclobutane-1,2-dicarboxylic dimethylester was split in the gaseous phase in a manner analogous to that described in the preceding examples at 700° C., a pressure of 10 mm. mercury and a time of residence of 0.11 second. The conversion rate was 92.1%. $\alpha$-chloro-acrylic acid methylester (B.P.$_{50}$:58° C.) and acrylic acid methylester were obtained in equal parts in a yield of 67.8% of the theoretical.

*Example 6*

1,2-dichloro-cyclobutane-1,2-dicarboxylic acid dimethylester was split under the conditions set forth in Example 5. The conversion rate was 88.4%, and $\alpha$-chloro-acrylic acid methylester was obtained in a yield of 64% of the theoretical.

*Example 7*

216 grams cyclobutane-1,2-dicarboxylic acid were caused to flow in vapor form at a pressure of 25 mm. mercury and at a temperature of 600° C. through an electrically heated quartz tube, and thermally split therein. The vapors were allowed to remain in the quartz tube for 0.13 second. The cleavage gases flowing off were condensed and collected in a receiver cooled at —70° C. Fractional distillation of the condensate yielded 92 grams acrylic acid having a purity of 99.8%, corresponding to a yield of 42.5% of the theoretical. The conversion was quantitative, and ethylene, acetylene, carbon monoxide and carbon dioxide were obtained under these conditions as by-products.

*Example 8*

228 grams 1,2-diaminomethyl-cyclobutane were split at a pressure of 20 mm. mercury, a temperature of 600° C. and within 0.1 second in a quartz tube. The resulting gaseous reaction products were condensed and collected in a receiver cooled at —70° C. Fractional distillation of the condensate yielded 131 grams unreacted starting product and 30 grams allyl amine, corresponding to a yield of 31% of the theoretical, calculated on a conversion rate of 42.6%. Acetylene, ethylene, propylene, ammonia and hydrogen were obtained as by-products of the thermal cleavage reaction.

What is claimed is:

1. A process for the manufacture of ethylenes substituted in the 1-position, consisting essentially in passing a vaporized starting compound of the formula

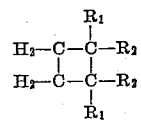

in which $R_1$ is individually defined as a member selected from the group consisting of hydrogen, chloro and bromo; $R_2$ is defined as a nitrile group, a carboxy group, an alkyl carboxy ester group having 1–4 carbon atoms in the alkyl moiety, or —$CH_2$—$NH_2$, with the proviso that when $R_2$ is defined as —$CH_2$—$NH_2$ each of $R_1$ is hydrogen, and with the proviso that at least one $R_1$ is defined as chloro or bromo when $R_2$ is defined as a nitrile group; passing the starting compound in vapor form through a heated tubular reactor at a temperature of about 400–1000° C. at a pressure of about 1–200 mm. mercury and a reactor residence time of about .1–10 seconds to effect thermal splitting of the starting compound; and thereafter condensing and recovering the resulting product to obtain a compound corresponding of the general formula

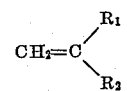

in which $R_1$ and $R_2$ are as above defined.

2. The process of claim 1 wherein the starting compound is thermally split at a temperature of about 600–700° C. at a pressure of about 5–20 mm. mercury and with a 0.5–2 second reactor residence time.

3. The process of claim 1 wherein the starting compound is
  (a) 1,2-diaminomethyl-cyclobutane,
  (b) 1-chloro-cyclobutane-1,2-dinitrile,
  (c) 1-bromo-cyclobutane-1,2-dinitrile,
  (d) 1,2-dichloro-cyclobutane-1,2-dinitrile,
  (e) 1,2-dibromo-cyclobutane-1,2-dinitrile,
  (f) cyclobutane-1,2-dicarboxylic acid,
  (g) 1-chloro-cyclobutane-1,2-dicarboxylic acid,
  (h) 1-bromo-cyclobutane-1,2-dicarboxylic acid,
  (i) 1,2-dichloro-cyclobutane-1,2-dicarboxylic acid,
  (j) 1,2-dibromo-cyclobutane-1,2-dicarboxylic acid or the corresponding alkyl esters of (f)–(j) wherein the alkyl component has 1–4 carbon atoms.

4. The process of claim 1 wherein $R_1$ is chloro or bromo.

5. The process of claim 1 wherein hot cleavage gas product from the reactor is cooled to a temperature of about 20–30° C. and thereafter liquefied in a receiver at a temperature of about −70° C.

References Cited

UNITED STATES PATENTS 2,773,089  12/1956  Anderson _____ 260—465.9 X
3,092,654  6/1963   Schreyer _____ 260—464 X JOSEPH P. BRUST, *Primary Examiner*.